Dec. 31, 1963
W. F. APPELT ET AL
3,115,848
MONORAIL VEHICLE
Filed May 11, 1960
4 Sheets-Sheet 2
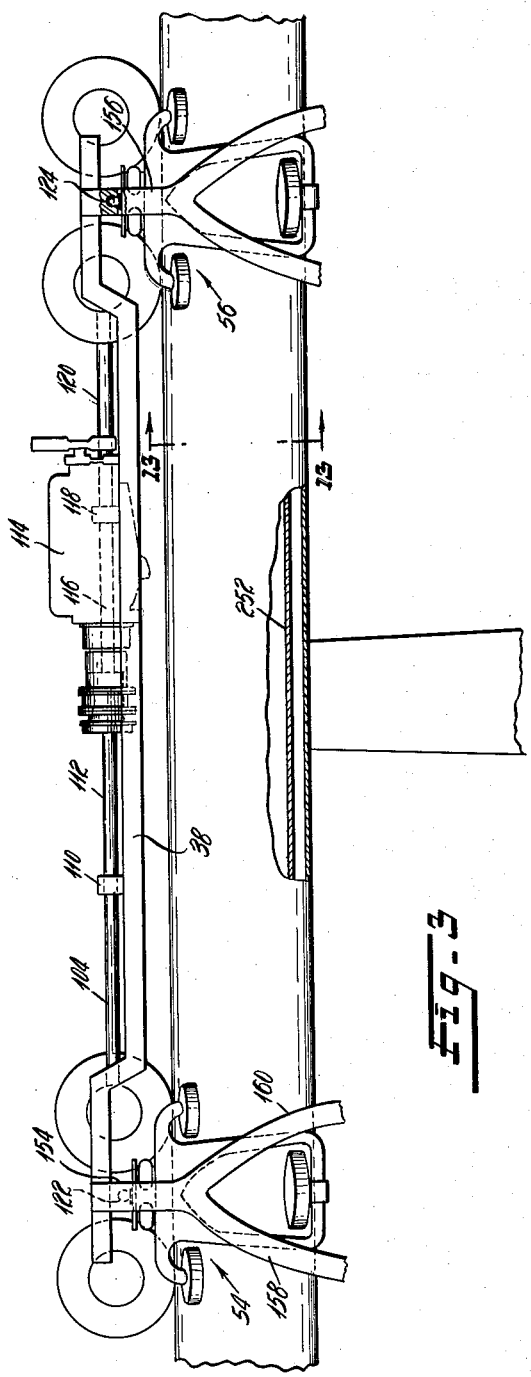
INVENTORS
Weldon F. Appelt
Felix R. Davis
BY
ATTORNEYS INVENTOR
Weldon F. Appelt
Felix R. Davis

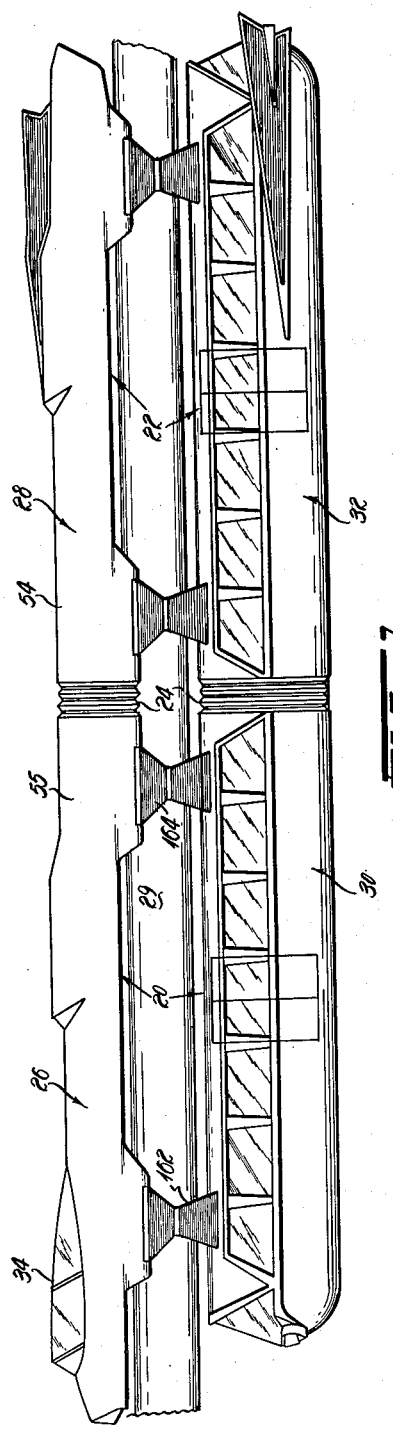
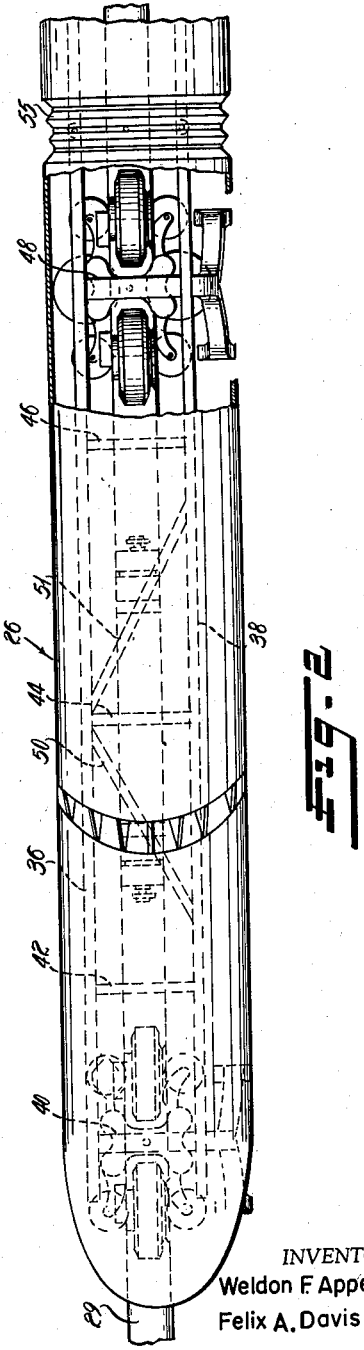

ATTORNEYS

Dec. 31, 1963  W. F. APPELT ET AL  3,115,848
MONORAIL VEHICLE
Filed May 11, 1960  4 Sheets-Sheet 4
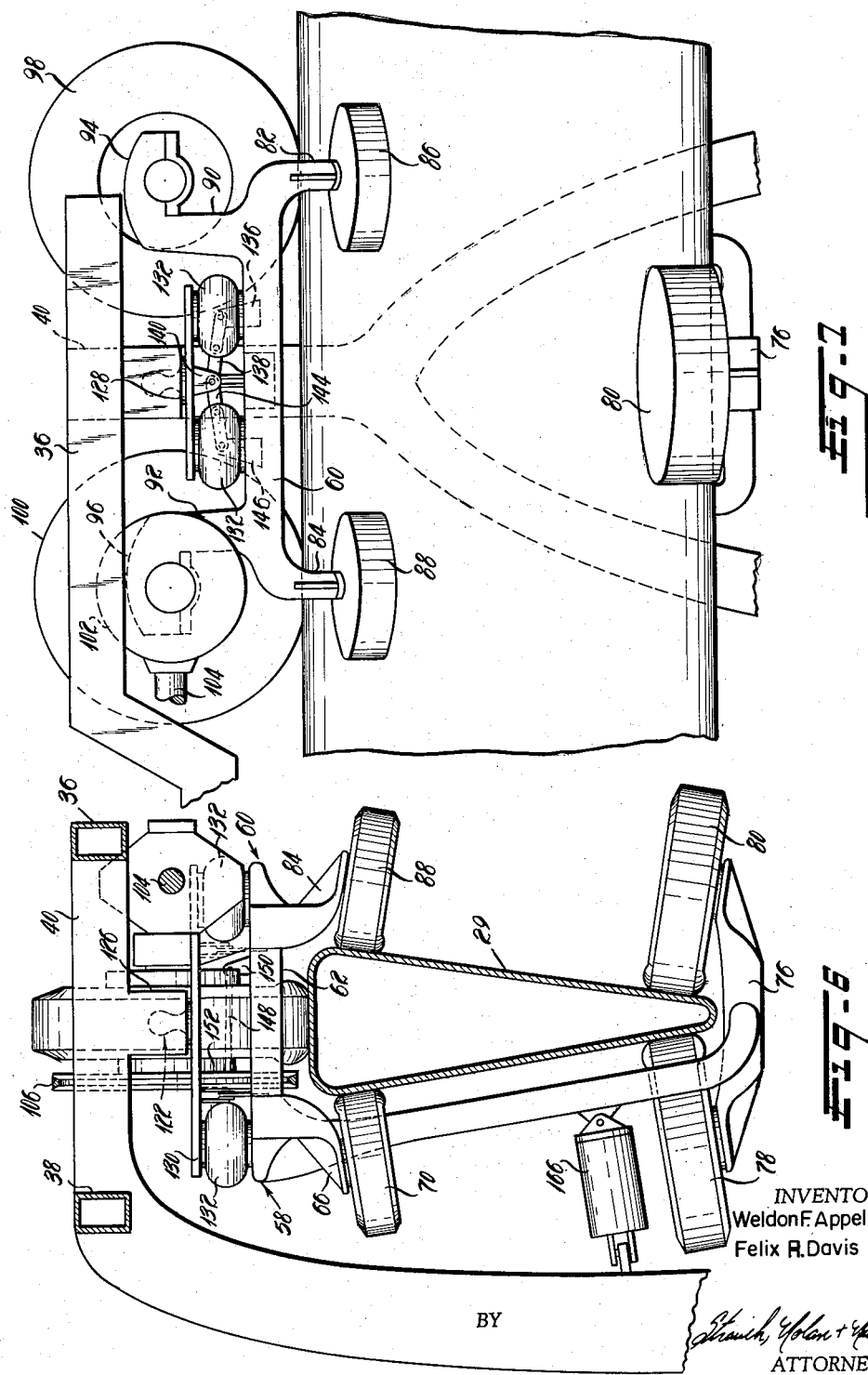
INVENTOR
Weldon F. Appelt
Felix R. Davis
BY
ATTORNEYS 3,115,848
Patented Dec. 31, 1963

3,115,848
MONORAIL VEHICLE
Weldon F. Appelt, 1111 Rosalie St., Houston, Tex., and Felix A. Davis, % Clear Span Co. Inc., 4118 Fannin St., Houston 4, Tex.
Filed May 11, 1960, Ser. No. 169,986
4 Claims. (Cl. 105—145)
(Filed under Rule 47(b) and 35 U.S.C. 118)

This invention relates to monorail systems and more particularly to improved vehicle constructions for said systems.

While in certain aspects the invention is of general utility in the field of monorail transportation, the invention is primarily directed to improvements in monorail systems of the type in which the passenger or cargo carrying vehicle is suspended below the track from a compact drive unit which travels along the top of the track. The monorail systems of the present invention are capable of transporting passagers or cargo or both with a speed and economy which is not approached by conventional systems.

Although monorail systems have been in limited operation for a number of years and their advantages have long been known, they have not met with widespread acceptance. In large part, the failures of such prior systems to achieve acceptance has been due to the relatively high cost and complexity of both the vehicles and the monorail tracks. Problems have also been encountered in providing a stable, comfortable ride particularly at relatively high speeds.

It is accordingly an important object of the present invention to provide significant improvements in vehicles for monorail systems and to provide vehicles which are of relatively simplified, lightweight construction and which operate in a unique manner to stabilize the vehicle and permit the smooth, stable high speed passage of the vehicle along the track.

It is also an object of the present invention to provide improved systems for suspending the passenger or cargo carrying vehicles from the drive components.

It is a further object of the present invention to provide improved monorail bogie and chassis constructions and suspension systems which substantially reduce the stresses applied to the vehicle bodies per se and thus permit a substantial reduction in the weight of the vehicles.

It is also an object of the present invention to provide improved monorail systems including vehicle constructions for stabilizing the vehicle against lateral displacement and swaying movements.

Additional objects and advantages will become apparent as the description proceeds in connection with the accompanying drawings in which:

FIGURE 1 is a side elevation of a monorail vehicle and track constructed in accordance with the present invention;

FIGURE 2 is a fragmentary top plan view of the vehicle and track of FIGURE 1 with parts broken away to show interior detail;

FIGURE 3 is aside elevation of the chassis assembly of the vehicle shown in FIGURE 2 with parts of the supporting track broken away to shown interior details;

FIGURE 6 is a transverse section taken along line 6—6 of FIGURE 5; and

FIGURE 7 is an elevation of the side of the bogie unit opposite the side shown in FIGURE 5.

Figure 4:
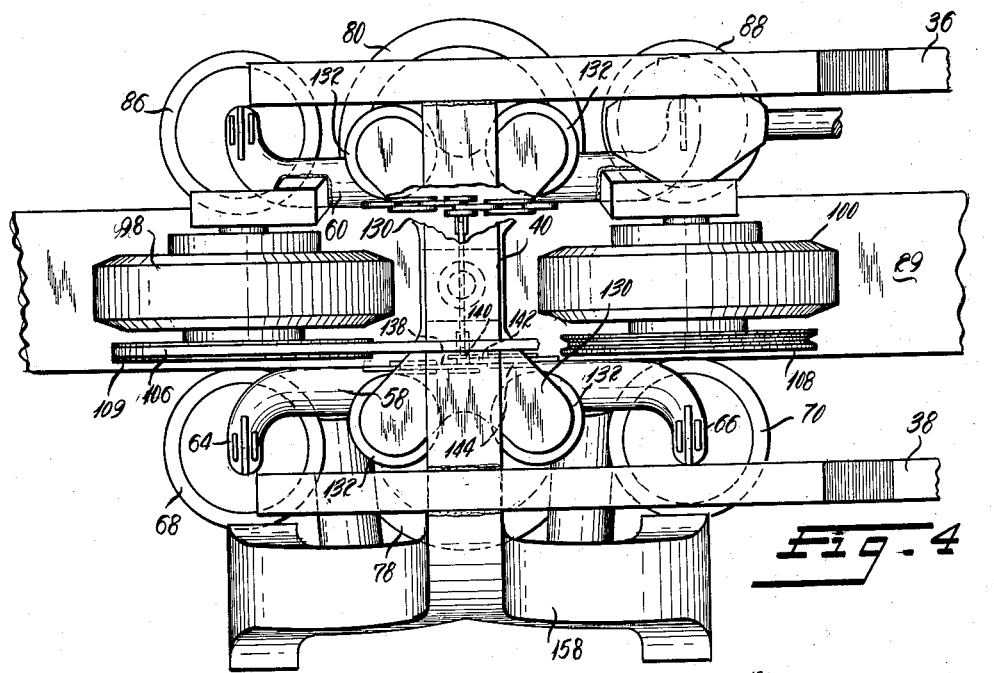
FIGURES 4 and 5 are top and side elevations, respectively, of one of the bogie constructions for supporting the vehicle for passage along the monorail track.
Figure 5:
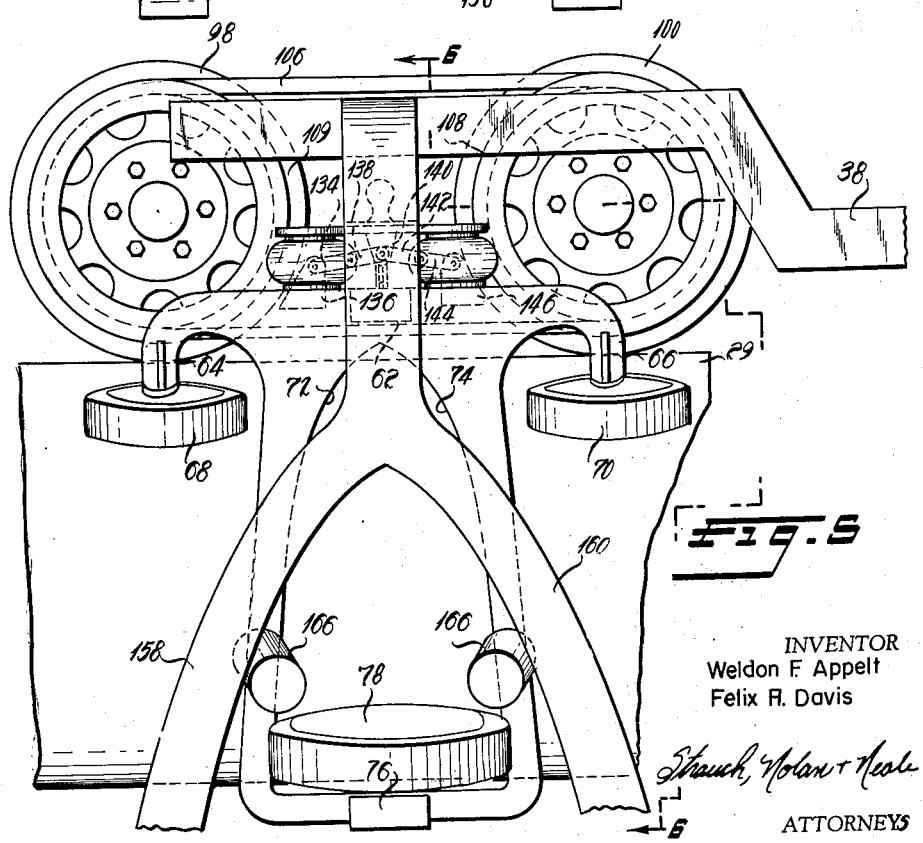

Referring now more particularly to the drawings, FIGURE 1 illustrates a typical train unit for the present invention which comprises two vehicle units indicated generally at 20 and 22, respectively, connected by a flexible unit 24 to permit articulation of the two main units. While two vehicle units have been shown, it will be understood that a train in accordance with the present invention may be made up of any desired number of separate units. Vehicle units 20 and 22 comprise upper drive units 26 and 28, respectively, which travel along the upper surface of the elevated track 29 and lower load carrying units 30 and 32, respectively, suspended below the track and which in the form of the invention shown are adapted to carry passengers, although they also may be cargo carrying units. The forward upper unit 26 is provided with an operator's compartment 34 from which the operation of the entire train can be controlled. Apart from the provision of the driver's compartment in the unit 26, and other differences in external appearance, the front and rear assemblies 20 and 22 are of substantially identical construction. Accordingly, only the forward unit 20 will be described in detail.

The upper unit 26 comprises an elongated rigid chassis frame structure including side rails 36 and 38 to which cross members 40, 42, 44, 46 and 48 are rigidly secured as by welding. The chassis structure is completed by diagonal brace members 50 and 51 to provide a strong, lightweight rigid structure which is resistant to bending and twisting.

The body shells are of conventional construction and are mounted in the usual manner on the chassis units and will not be described in detail.

The chassis units of the front and rear vehicles 20 and 22 are detachably coupled by a conventional unit 55, the details of which do not form a part of the present invention.

As best shown in FIGURES 3, 4 and 7 the end portions of the members 36 and 38 to which the cross members 40 and 48 are welded are relatively raised to accommodate identical front and rear bogie assemblies indicated generally at 54 and 56, the former being illustrated in detail in FIGURES 4 through 7 to which detailed reference will now be made. The bogie assembly 54 comprises side frame assemblies 58 and 60 positioned at opposite sides of the track 29, the central portions of which are joined by a rigid cross frame member 62 which extends across the top of the track 29. The frame assembly 58 is provided with a pair of downwardly projecting arms 64 and 66 which rotatably support front and rear side guide wheels 68 and 70, respectively, which engage one side of the track adjacent the upper edge thereof. Also formed integrally with the side frame assembly 58 are a pair of downwardly projecting arms 72 and 74 which are rigidly joined at their lower ends to a plate-like wheel mounting assembly 76 which rotatably supports a pair of lower guide wheels 78 and 80 which are adapted to engage the opposite side surfaces of the track adjacent the lower edge thereof.

At its opposite ends the side frame assembly 60 is provided with a pair of downwardly projecting arms 82 and 84 which rotatably support side wheels 86 and 88 for engagement with the side surfaces of the track 29 opposite the respective wheels 68 and 70. Also formed on the side frame assembly 60 are a pair of upwardly projecting arms 90 and 92 which are provided with cantilever supports 94 and 96 for the main load carrying and drive wheels 98 and 100, respectively. Preferably all of the track engaging wheels are provided with conventional pneumatic tires.

Also carried by the mount assembly 96 is a gear housing 102 which transmits torque from a drive shaft 104 to the wheel assembly 100. Preferably the rear wheel 100 is drivingly connected to the front wheel 98 by drive belt 106 carried by pulleys 108 and 109 rigid with the respective wheels 100 and 98. The drive shaft 104 is connected through a universal joint 110 to a drive shaft 112 driven by a gasoline or diesel engine or other suitable prime mover 114 suitably mounted on the main chassis frame structure. A similar drive connection is made through shafts 116, universal joint 118 and shaft 120 to the rear bogie assembly 56.

The main chassis assembly is mounted on the bogie assemblies 54 and 56 by identical ball and socket assemblies 122 and 124, respectively. A socket portion of the assembly is formed by a member 126 projecting downwardly from the central portion of the end cross member 40. The ball member 128 is rigid with the central portion of an intermediate plate 130, the corners of which are suspended on pneumatic spring and shock absorbing assemblies 132, the lower ends of which in turn are supported by projections formed integrally with the side frame assemblies 58 and 60. The pneumatic spring assemblies 132 are of conventional construction arranged to permit restricted vertical movement between the plate 130 and the remainder of the bogie assembly but are provided with suitable internal structure, not shown, to limit relative movement between the parts in a direction laterally or longitudinally of the track 29. The internal mechanisms are not of sufficient strength to assure proper stability of the system particularly when forces due to acceleration or deceleration are high.

Accordingly, a stabilizer linkage system of unique construction has been provided which will now be described in detail. The linkage system to absorb acceleration and deceleration inertia loads comprises a double link 134 pivotally mounted at one end on a lug 136 rigid with the bogie frame member 58 and pivotally connected at its opposite end to a second link 138, the opposite end of which is pivotally mounted on a lug 140 depending from the underside of the plate 130 laterally opposite the axis of the ball member 128. A similar linkage system comprising a single link 142, a double link 144 and a mounting lug 146 connects the plate 130 to the rearward portion of the bogie. Identical linkage systems are provided at the opposite side of the bogie to connect the plate 130 and the bogie frame member 60.

Lateral stabilization is effected by a link 148, one end of which is pivotally carried by a lug 150 rigid with a central bogie cross member 62, the opposite end of which is pivotally carried by a lug 152 depending from the underside of the plate 130. As shown in FIGURES 4 and 7 the stabilizer link 148 extends laterally of the assembly directly beneath the axis of the ball member 128. Thus these linkage systems are effective to absorb both laterally and longitudinally directed loads without interfering with the free vertical movement of the chassis with respect to the bogie.

The cars 30 and 32 are suspended from the upper chassis sections by front and rear hanger arm assemblies 154 and 156, respectively, which are of identical construction. The hanger arm assemblies are formed integrally or welded to one end of the end chassis cross members 40 and 48, respectively, and project to one side of the chassis structure downwardly along the side of the track outwardly of the side guide wheels and are bifurcated to provide arms 158 and 160 which are rigidly attached by means not shown to the body structure of the cars 30 or 32 so as to dispose the center of gravity of the cars directly beneath the track as shown for example in FIGURE 8. Hanger arms are enclosed in decorative sheet metal housings 162 and 164, respectively. It is a feature of the invention that by virtue of the above described construction all of the major forces produced by acceleration or deceleration of the vehicle or by a tendency of one of the bogies to overdrive the other as well as the forces arising from swaying or tilting movements are absorbed by the strong, rigid yet lightweight upper chassis construction. Accordingly, the main passenger or load carrying car sections 30 and 32 may be of lightweight construction since they need support only those loads which are imposed by gravity.

To provide further stabilization of the cars against lateral swaying or tilting movements, shock absorbers 166 are connected between each of the hanger arms 158 and 160 and the adjacent arms 72 and 74 of the bogies. As best shown in FIGURE 6, one end of the shock absorbers 166 is connected to the hanger arms for pivotal movement about a substantially vertical axis and the opposite end of the shock absorbers is connected to the bogie for pivotal movement about a substantially horizontal axis, thus providing a universal connection to permit the desired limited relative movement between the parts.

The construction of the beam in the form of the triangular section not only achieves a maximum strength-to-weight ratio and provides a construction which has exceptionally high resistance to the types of loads which are applied by the vehicles in operation but also cooperates with the vehicle structure in a unique manner to stabilize the latter in its passage along the beam. For example, when the vehicle is subjected to unusually high lateral forces, which occur in a curved section of track, the side wheels on one side of the track will ride down opposite the smaller area of the triangle to permit limited tilt of the vehicle which facilitates its passage through the curve. However, the wheels on the opposite side tend to ride up into an area opposite the larger section of the triangle and thus exert a restoring force which is effective to right the vehicle promptly when the excessive lateral force is removed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A monorail vehicle adapted to travel along a track beam having a substantially horizontal top running surface and side running surfaces comprising first and second unitary frame assemblies, wheels rotatably mounted on each of said frame assemblies for engagement with said track beam running surfaces, a pair of intermediate support assemblies, spring means supporting one of said intermediate support assemblies on said first and second frame structures, respectively, stabilizer means connecting one of said intermediate support assemblies and said first frame assembly for preventing relative lateral movement of said one intermediate support assembly with respect to said first frame assembly, stabilizer means connecting the other of said intermediate support assemblies with said second frame assembly for preventing relative lateral movement of said other intermediate assembly with respect to said second frame assembly, a third unitary frame structure, means pivotally connecting said third frame structure at its opposite ends to said intermediate support assemblies, a coach assembly, and hanger arms rigid with said third frame assembly for suspending said coach from said third frame assembly.

2. A chassis construction for a monorail vehicle adapted to travel along a track beam having a substantially horizontal top running surface and side running surfaces, comprising a horizontal main cross beam extending laterally over the top of said track, a pair of horizontal side beams rigid with the opposite ends of said main beam, cantilever supports rigid with one of said side beams and projecting upwardly therefrom, main wheels rotatably mounted on the respective cantilever supports, a pair of support arms projecting downwardly from each of said side beams, auxiliary side wheels rotatably carried by said support arms for engagement with said track beam side running surfaces, additional support arms projecting downwardly from one of said side beams and extending around the lower edge of said track beam, and wheels rotatably carried by said additional support arms at each side of the lower portion of said track.

3. A chassis construction for a monorail vehicle adapted to travel along a track beam having a substantially horizontal top running surface and generally vertical side running surfaces comprising a pair of bogie assemblies, each of said bogie assemblies comprising a main cross beam extending laterally over the top of said track, a pair of horizontal side beams rigid with the opposite ends of said main beam, cantilever supports rigid with one of said side beams and projecting upwardly therefrom, main wheels rotatably mounted in the respective cantilever supports, a pair of support arms projecting downwardly from each of said side beams, auxiliary wheels rotatably carried by said support arms, additional support arms projecting downwardly from one of said side beams and extending adjacent the lower edge of said track beam, wheels rotatably carried by said additional support arms at each side of said track, intermediate support plates, respectively, spring suspended from said bogie assemblies, and a rigid frame pivotally connected adjacent its opposite ends to the respective intermediate support plates.

4. The combination according to claim 3 together with a coach assembly, and hanger arms having their upper ends rigid with said frame and their lower ends rigid with said coach assembly for suspending said coach assembly from said frame.

References Cited in the file of this patent
OTHER REFERENCES

| | | |
|---|---|---|
| 1,961,753 | Fish | June 5, 1934 |
| 2,976,818 | Bingham | Mar. 28, 1961 |
| 2,985,376 | Smith | May 23, 1961 |
| 2,993,647 | Deller | July 25, 1961 |